United States Patent
Arrivet et al.

(10) Patent No.: US 9,140,422 B2
(45) Date of Patent: Sep. 22, 2015

(54) AUTOMOTIVE REAR LIGHT (75) Inventors: Frank Arrivet, Montigny le Bretonneux (FR); Alain Buisson, Trappes (FR); Franco Marcori, Moggio Udinese (IT); Benoit Samson, Saint Remy les Chevreuse (FR)

(73) Assignee: Automotive Lighting Italia S.p.A., Venaria Reale (IT)

( * ) Notice: Subject to any disclaimer, the term of this patent is extended or adjusted under 35 U.S.C. 154(b) by 61 days.

(21) Appl. No.: 14/233,448

(22) PCT Filed: Jul. 18, 2012

(86) PCT No.: PCT/IB2012/053663
§ 371 (c)(1),
(2), (4) Date: May 16, 2014

(87) PCT Pub. No.: WO2013/011468
PCT Pub. Date: Jan. 24, 2013

(65) Prior Publication Data
US 2014/0247616 A1 Sep. 4, 2014

(30) Foreign Application Priority Data
Jul. 18, 2011 (EP) .................................... 11425194

(51) Int. Cl.
*F21V 9/00* (2015.01)
*F21S 8/10* (2006.01)
*B60Q 1/00* (2006.01)
*B60Q 1/26* (2006.01)

(52) U.S. Cl.
CPC ............... *F21S 48/00* (2013.01); *B60Q 1/0052* (2013.01); *B60Q 1/2607* (2013.01); *F21S 48/215* (2013.01); *F21S 48/218* (2013.01); *F21S 48/225* (2013.01); *F21S 48/2225* (2013.01); *F21S 48/2237* (2013.01); *F21S 48/2262* (2013.01); *F21S 48/2281* (2013.01)

(58) Field of Classification Search
CPC ....... F21S 48/00; F21S 48/215; F21S 48/218; F21S 48/2225; F21S 48/2231; F21S 48/2243; F21S 48/225; F21S 48/2262; F21S 48/2281; B60Q 1/0011; B60Q 1/2607
USPC ........................................... 362/511, 520–522
See application file for complete search history.

(56) References Cited

FOREIGN PATENT DOCUMENTS

| DE | 10239838 | 3/2004 |
|----|----------|--------|
| EP | 1898147 A1 | 3/2008 |
| EP | 2098774 A1 | 9/2009 |
| EP | 2261083 A1 | 12/2010 |
| JP | 2006236588 | 9/2006 |

OTHER PUBLICATIONS

PCT International Search Report and Written Opinion dated Nov. 8, 2012; 10 pages.

*Primary Examiner* — Jason Moon Han
(74) *Attorney, Agent, or Firm* — McCarter & English, LLP (57) ABSTRACT

An automotive light is provided having a substantially tub-shaped rear casing designed to fit to the vehicle body and a front lenticular half-shell which closes the opening of the rear casing and has at least one portion of transparent or semi-transparent material. The front lenticular half-shell includes a rear portion substantially aligned with the rear of the vehicle body, and a lateral portion substantially aligned with the side of the vehicle body. The automotive light also includes a strip light source designed to emit light when powered electrically and a light guide plate of photoconductive material shaped to substantially match the profile of the strip light source and housed inside the rear casing in a position substantially perpendicular to the rear portion of the front lenticular half-shell. A first side of the plate conducts light from the strip light source into the body of the light guide plate, and a second side of the plate directs light propagating in the light guide plate onto the lenticular half-shell. A transverse light-extracting band is provided to locally extract light onto a lateral portion of the front lenticular half-shell.

17 Claims, 4 Drawing Sheets

AUTOMOTIVE REAR LIGHT

TECHNICAL FIELD

The present invention relates to an automotive rear light.

More specifically, the present invention relates to a rear light for passenger cars and similar vehicles, to which the following description refers purely by way of example.

BACKGROUND ART

As is known, car rear lights normally comprise a rigid, substantially tub-shaped rear casing which fits firmly inside a seat in the rear of the vehicle body; a front lenticular half-shell made at least partly of transparent or semitransparent, usually coloured, plastic material, and which closes the casing opening and emerges outside of the vehicle body; a number of substantially parabolic cup-shaped bodies located/formed in the rear casing, with their concavities facing the front lenticular half-shell, and each aligned with a respective transparent or semitransparent portion of the front lenticular half-shell; and a number of incandescent bulbs, each located at the bottom of a respective cup-shaped body to only backlight the transparent or semitransparent portion of the half-shell aligned over the cup-shaped body. The inner surface of each cup-shaped body is usually mirrored to focus the light from the incandescent bulb onto the corresponding transparent or semitransparent portion of the front lenticular half-shell.

Over the past few years, car rear lights have become increasingly integrated in the outer contour of the vehicle body, even to the point of wrapping round the two edges between the rear and sides of the car body, thus making it necessary to employ highly complex three-dimensional front lenticular half-shells.

In addition, leading car manufacturers have also begun demanding rear lights in which the light signals issue from long, narrow portions of the front lenticular half-shell.

To begin with, this was only demanded of low-intensity light signals used at night to indicate the position/presence of the vehicle, i.e. for parking lights, so most car rear light manufacturers opted to form long, narrow, transparent or semitransparent portions on the front lenticular half-shell of the light, and to backlight these strip-shaped transparent or semitransparent portions using light guide bars made of photoconductive material, and each of which extends beneath the front lenticular half-shell, and is substantially the same width as, and extends the full length of, the corresponding strip-shaped portion for backlighting.

More specifically, each light guide bar receives light from one or more light-emitting diodes, traditionally named LEDs, located on one of the two ends of the bar normally located far from the transparent or semitransparent portion to be backlighted, and is designed so that the light from the LED comes out gradually and in controlled manner from the lateral surface of the bar directly facing the front lenticular half-shell, so as to backlight the whole length of the transparent or semitransparent portion of the half-shell.

Unfortunately, being unable to produce high-intensity light beams, this system of backlighting strip-shaped portions of the front lenticular half-shell failed to meet later demand by car manufacturers for the same design for high-intensity light signals indicating operation of the vehicle's brake system, i.e. for the stop lights.

To produce a strip-shaped light signal of automotive regulation intensity, most car rear light manufacturers therefore opted to install, beneath the strip-shaped transparent or semitransparent portion/s of the front lenticular half-shell associated with the stop signal, a strip of high-efficiency LEDs of the same shape as the transparent or semitransparent portion for backlighting, and capable of producing a sufficiently homogeneous, intense light beam.

Unfortunately, to accommodate both backlighting systems in the light, and achieve from both light signals a field depth and visibility comparable with those of a normal incandescent bulb, relatively high-cost design solutions are required, which seriously increase the manufacturing cost of automotive lights of this sort, with all the problems this entails.

DISCLOSURE OF INVENTION

It is an object of the present invention to reduce the manufacturing cost of car rear lights of this sort, while at the same time improving the strip-shaped appearance and visibility of the light signals indicating the position/presence of the vehicle and operation of the vehicle's brake system, i.e. the parking and stop lights.

According to the present invention, there is provided an automotive rear light as claimed in claim 1 and preferably, though not necessarily, in any of the Claims dependent on claim 1.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
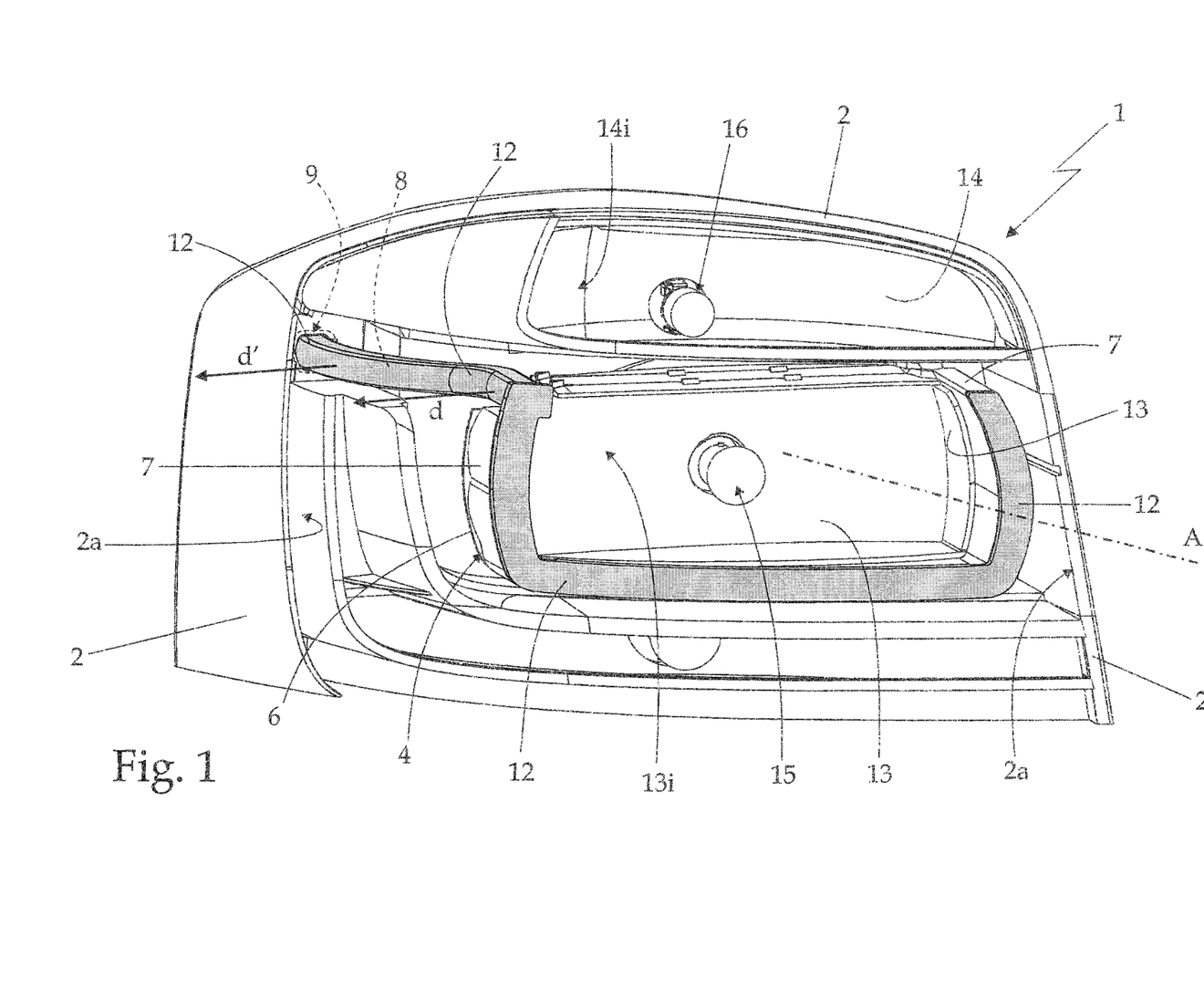
FIG. 1 shows a view in perspective, with parts removed for clarity, of an automotive rear light in accordance with the teachings of the present invention.
Figure 2:
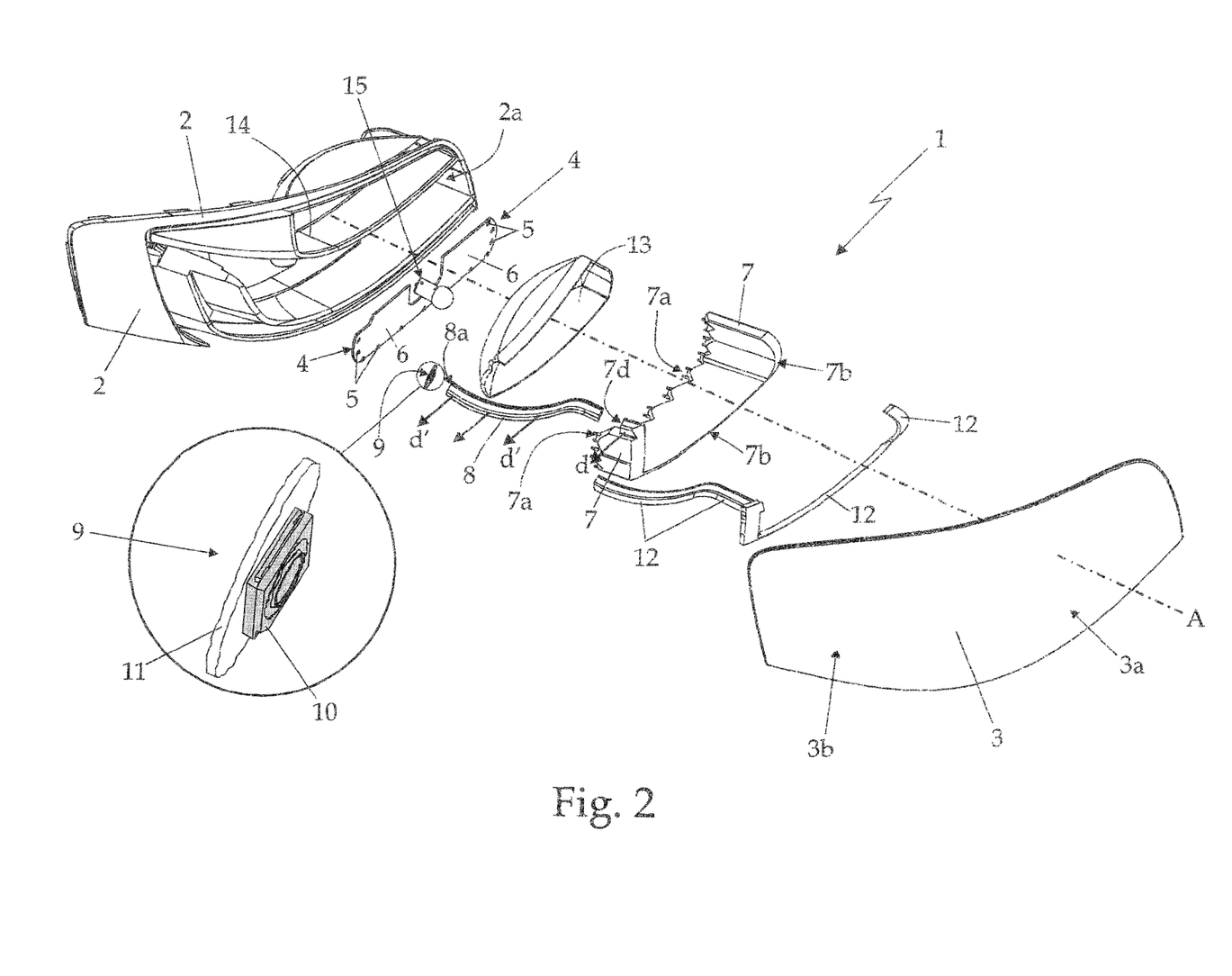
FIG. 2 shows an exploded view of the FIG. 1 automotive rear light.

Number 1 in FIGS. 1 and 2 indicates as a whole an automotive light particularly suitable for assembly to the rear body of a car, motorcycle or similar, i.e. an automotive rear light.

More specifically, automotive light 1 is preferably, though not necessarily, designed for recessed fitment to the rear of a car, and comprises:

- a rigid, substantially tub-shaped rear casing 2 designed to fit inside a seat in the rear of the vehicle body;
- a front lenticular half-shell 3, which has at least one portion made of transparent or semitransparent, optionally also coloured, material, and is arranged to close the opening 2a of rear casing 2 so as to be visible from the outside and preferably, though not necessarily, also emerge outside of the vehicle body (not shown); and
- a strip light source 4 designed to emit light when powered electrically, and which is housed inside, preferably at the bottom of, rear casing 2 to backlight a corresponding transparent or semitransparent portion of front lenticular half-shell 3.

In a different embodiment, rear casing 2 may obviously be designed to simply fit onto and project from the rear of the vehicle body.

With particular reference to FIG. 2, rear casing 2 is curved/substantially L-shaped, so that opening 2a faces outwards of the vehicle body (not shown) at the edge between the rear and side of the vehicle body, and so extends over part of both the rear and side of the vehicle body; whereas front lenticular half-shell 3 has a substantially L-shaped convex shape complementary to opening 2a of rear casing 2, to fully close/seal rear casing 2, and to emerge outside of the vehicle body (not shown) along both the rear and side of the body.

More specifically, front lenticular half-shell 3 has a rear portion 3a which emerges outside of the rear of the vehicle body (not shown); and a lateral portion 3b aligned with and which emerges outside of the side of the vehicle body (not shown).

In other words, rear portion 3a of lenticular half-shell 3 is substantially aligned with the rear of the vehicle body (not shown), whereas lateral portion 3b of lenticular half-shell 3 is substantially aligned with the side of the vehicle body (not shown).

In the example shown, furthermore, rear casing 2 is preferably, though not necessarily, entirely made of an opaque plastic material via an injection molding process; whereas front lenticular half-shell 3 is preferably, though not necessarily, entirely made of a transparent or semitransparent plastic material, optionally also colored and/or with one or more transparent or semitransparent portions of different color, as well via an injection molding process.

Figure 4:
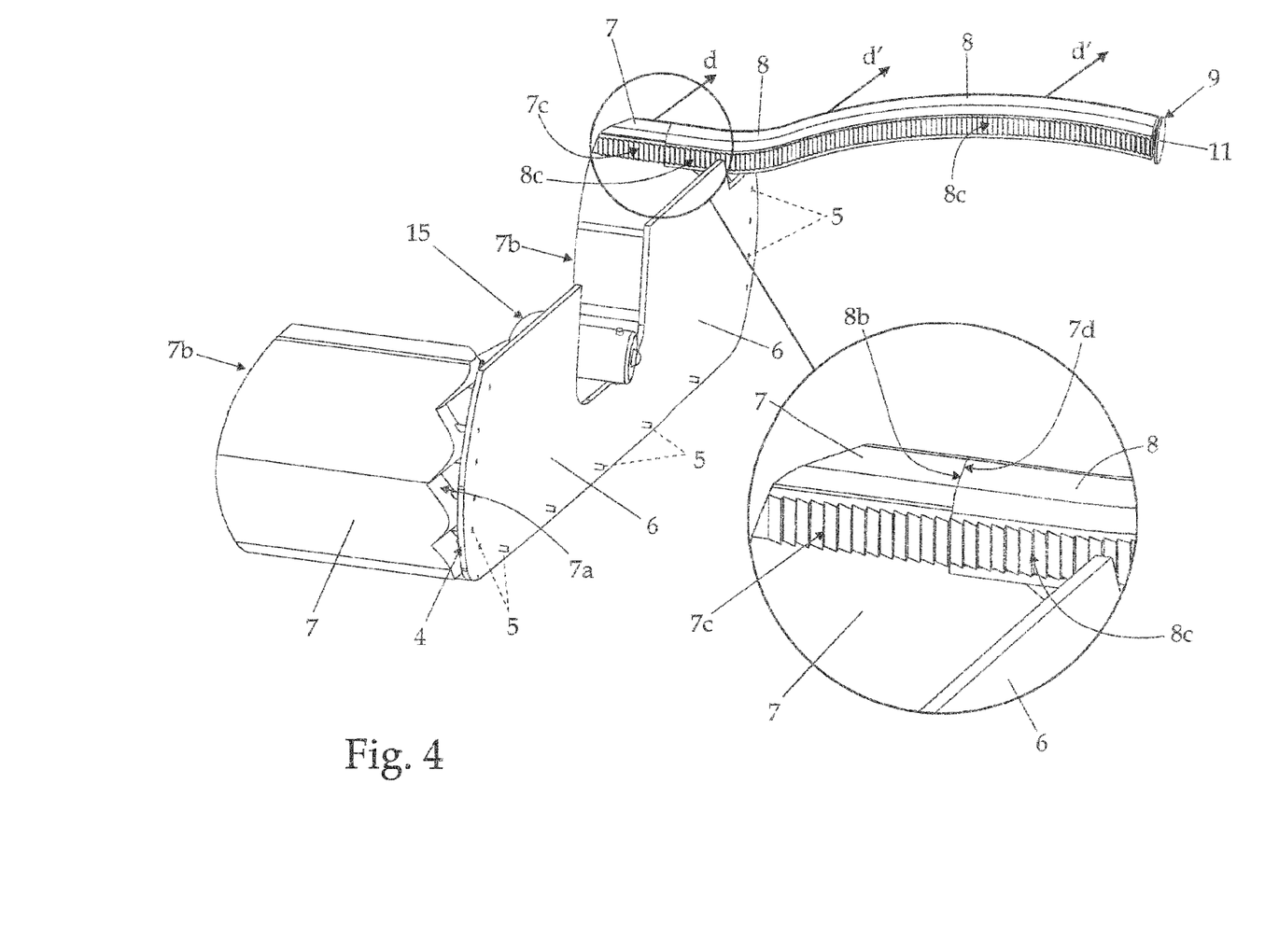
FIG. 4 shows a larger-scale view of parts of the FIG. 1 automotive rear light from a different angle.

With reference to FIGS. 2 and 4, strip light source 4 is positioned facing rear portion 3a of front lenticular half-shell 3 to backlight rear portion 3a, and preferably comprises a number of light-emitting diodes (LEDs) 5 arranged side by side on a supporting board 6 designed to fit inside, roughly at the bottom of, rear casing 2, with light-emitting diodes 5 facing rear portion 3a of front lenticular half-shell 3.

More specifically, in the example shown, LEDs 5 are preferably arranged along a peripheral edge portion of a substantially rectangular supporting board 6, so as to preferably, though not necessarily, form a substantially U- or C-shaped strip light source 4.

As shown in the drawings, automotive light 1 also comprises a light guide plate 7 of photoconductive material, which is curved to substantially the same shape as strip light source 4, and is housed/fixed inside rear casing 2 in a position substantially perpendicular to rear portion 3a of lenticular half-shell 3, so that a first side 7a of the plate rests on or at any rate directly faces LEDs 5 of strip light source 4 to catch and channel the light from strip light source 4 directly into the body of light guide plate 7; and so that a second side 7b of the plate, opposite side 7a, closely faces the inner surface of rear portion 3a of lenticular half-shell 3 to direct the light propagating inside light guide plate 7 onto lenticular half-shell 3.

In other words, light guide plate 7 of photoconductive material is curved perpendicularly to its plane, so that its inner and outer sides 7a and 7b substantially copy the shape of strip light source 4, and is housed inside rear casing 2, next to strip light source 4, so that the light from strip light source 4 flows through inner side 7a into the body of light guide plate 7, travels inside light guide plate 7 to outer side 7b in the same way as along fibre optic cables, and comes out directly onto lenticular half-shell 3.

In the example shown, light guide plate 7 of photoconductive material is curved perpendicularly to its plane into a substantially U or C shape, but may alternatively be shaped to form a tubular body.

In the example shown, light guide plate 7 is also preferably, though not necessarily, of a nominal thickness ranging between 1 and 30 millimeters, and is preferably, though not necessarily, injection molded entirely from transparent or semitransparent plastic material, such as polymethyl methacrylate or polycarbonate. Outer side 7b of light guide plate 7 may also have optical elements or surface microinterruptions, e.g. may be embossed, sanded or stencil printed, to diffuse the light randomly.

Inner side 7a of light guide plate 7 may have a number of dead seats, each for receiving a respective LED 5 of strip light source 4, and shaped to collimate the light beam from LED 5, to form a TIR LED.

Light guide plate 7 as a whole is designed to channel/direct substantially all the light, entering it through inner side 7a, to outer side 7b, with substantially no dispersion by the two faces. In other words, the two major faces of light guide plate 7 have smooth surfaces to retain the light inside the body of light guide plate 7.

Figure 3:
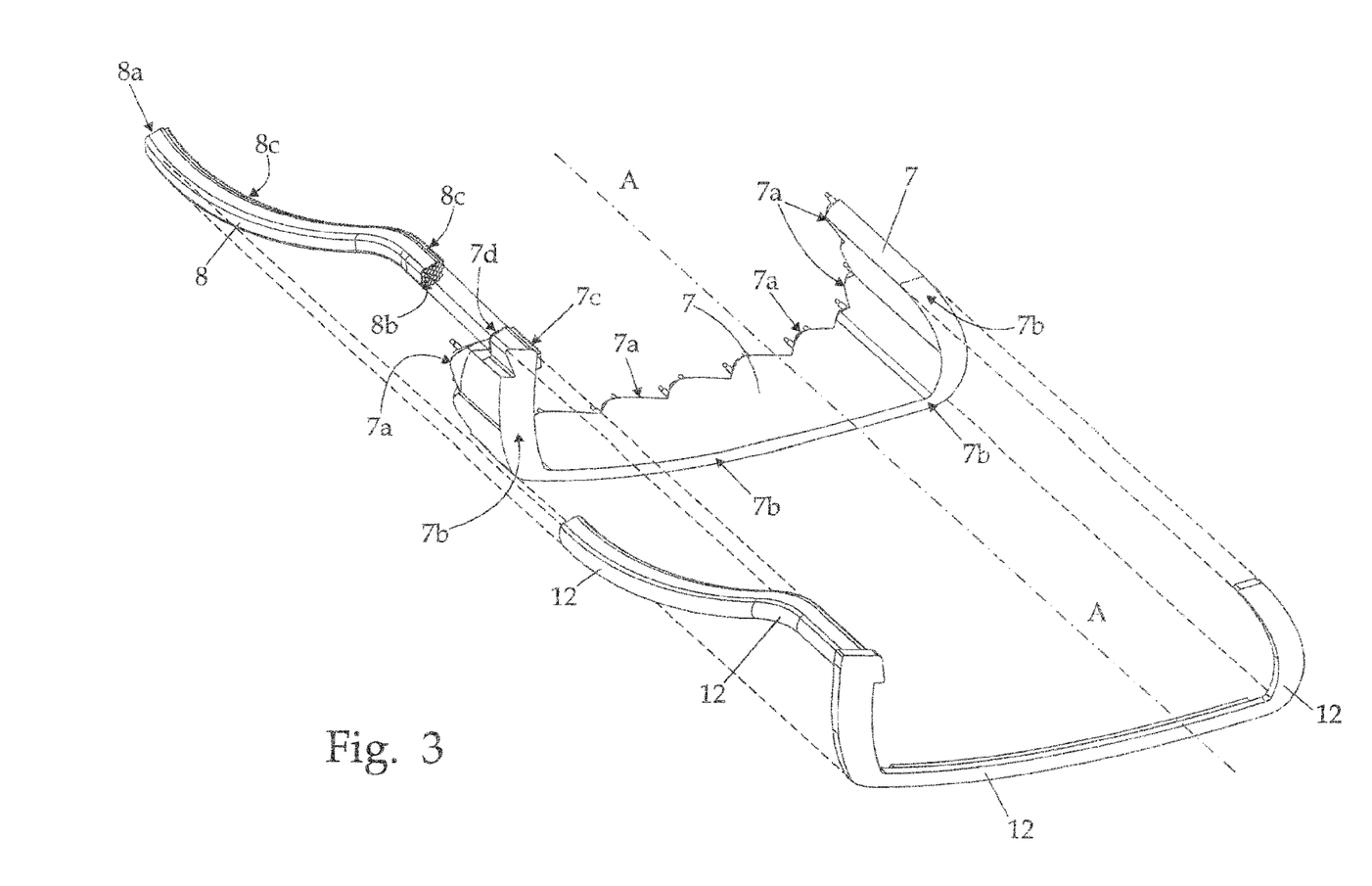
FIG. 3 shows a larger-scale view of part of the FIG. 2 automotive rear light from a different angle.

With reference to FIGS. 2, 3 and 4, one of the two faces of light guide plate 7 has a narrow transverse light-extracting band 7c, which extends, preferably seamlessly, from outer side 7b to substantially inner side 7a of light guide plate 7, and is designed/shaped to divert the light propagating in that limited portion of light guide plate 7 onto lateral portion 3b of front lenticular half-shell 3, so as to form a narrow transverse light strip on lateral portion 3b of lenticular half-shell 3.

More specifically, transverse light-extracting band 7c of light guide plate 7 is preferably located on the opposite side of light guide plate 7 to lateral portion 3b of front lenticular half-shell 3, and is designed/shaped to gradually, and in controlled manner, extract the light, propagating in that limited portion of light guide plate 7, onto lateral portion 3b of front lenticular half-shell 3 in a direction d locally substantially perpendicular to the plane of light guide plate 7 and to the reference optical axis A of automotive light, which in turn is substantially parallel to the longitudinal axis of the vehicle (not shown).

In the example shown, transverse light-extracting band 7c preferably has a straight, serrated, substantially rack-like profile, and is preferably located very close to a lateral edge of light guide plate 7.

More specifically, transverse light-extracting band 7c of light guide plate 7 comprises a large number of straight transverse ridges or grooves, preferably with a substantially triangular profile, which are arranged side by side on the surface of light guide plate 7 to form a succession of minute, side by side deflecting prisms. These are shaped to locally divert the light rays in a direction d locally substantially perpendicular to the plane of light guide plate 7, and so force the light propagating inside light guide plate to exit gradually from the body of the plate onto lateral portion 3b of front lenticular half-shell 3 before reaching outer side 7b.

In other words, transverse light-extracting band 7c is designed to divert part of the light propagating inside light guide plate 7 onto lateral portion 3b of front lenticular half-shell 3, and so form/project on lateral portion 3b of front lenticular half-shell 3 a narrow transverse light strip substantially parallel to optical axis A of the automotive light and visible from the side of the vehicle.

With reference to FIGS. 1, 2, 3 and 4, automotive light 1 also comprises a light guide bar 8 of photoconductive material, which preferably, though not necessarily, has a substantially rectangular cross section with rounded corners, projects from rear side 7a of light guide plate 7, from the point where transverse light-extracting band 7c terminates, and extends towards the bottom of rear casing 2, while preferably substantially skirting lateral portion 3b of front lenticular half-shell 3; and an auxiliary light source 9 designed to emit light when powered electrically, and which is located on or at any rate next to the far end 8a of light guide bar 8, so the light emitted by auxiliary light source 9 enters the body of light guide bar 8 at far end 8a, and travels inside the body of light guide bar 8 into light guide plate 7, in the same way as in fibre optic cables.

In addition, the side of light guide bar 8 aligned with transverse light-extracting band 7c of light guide plate 7 has a longitudinal light-extracting band 8c designed/shaped to divert the light propagating inside the body of light guide bar 8 onto lateral portion 3b of front lenticular half-shell 3 in a direction d' locally substantially parallel to direction d, so as to form/project on lateral portion 3b of front lenticular half-shell 3 a narrow transverse light strip forming an extension of the transverse light strip produced by transverse light-extracting band 7c.

Alternatively, light guide bar 8 of photoconductive material may also have a substantially circular or oval cross section, still with longitudinal light-extracting band 8c aligned with transverse light-extracting band 7c of light guide plate 7.

Like transverse light-extracting band 7c of light guide plate 7, longitudinal light-extracting band 8c of light guide bar 8 is preferably located on the opposite side to lateral portion 3b of front lenticular half-shell 3. Like transverse light-extracting band 7c of light guide plate 7, in the example shown, longitudinal light-extracting band 8c of light guide bar 8 preferably has a straight, serrated, substantially rack-like profile, which preferably, though not necessarily, is the same shape as that of transverse light-extracting band 7c, and preferably extends seamlessly along substantially the whole length of light guide bar 8, so as to gradually, and in controlled manner, extract the light, propagating inside the body of light guide bar 8, onto lateral portion 3b of front lenticular half-shell 3.

More specifically, as shown in FIG. 4, like transverse light-extracting band 7c of light guide plate 7, longitudinal light-extracting band 8c of light guide bar 8 comprises a large number of straight transverse ridges or grooves, preferably with a substantially triangular profile, which are arranged side by side on the surface of light guide bar 8 to form a succession of minute, side by side deflecting prisms. These are shaped to locally divert the light rays in a direction d' locally substantially parallel to direction d, i.e. locally substantially perpendicular to the plane of light guide plate 7, and so force the light propagating inside light guide bar 8 to exit gradually from the body of the strip onto lateral portion 3b of front lenticular half-shell 3 before reaching outer side 7b of light guide plate 7.

With reference to FIGS. 3 and 4, in the example shown, in particular, light guide bar 8 is preferably defined by a photoconductive material rod 8 which preferably has a roughly rectangular cross section, has substantially the same thickness as light guide plate 7, is shaped so as to be locally substantially tangent to the inner surface of lateral portion 3b of front lenticular half-shell 3, and is finally arranged with its near end 8b resting on a seat or bevel 7d specifically realized on inner side 7a of light guide plate 7.

In the example shown, in particular, the near end 8b of photoconductive material rod 8, and the seat or bevel 7d on inner side 7a of light guide plate 7 are preferably, though not necessarily, provided with optical light-diffusing elements, such as cushion-, barrel- or cylindrical-shaped lenses.

More specifically, in the example shown, light guide bar 8 is defined by a rod 8 of the same transparent plastic material, e.g. polymethyl methacrylate or polycarbonate, as light guide plate 7, and is preferably injection molded.

Obviously, in a different embodiment, light guide bar 8 may be formed in one piece with light guide plate 7. With reference to FIG. 2, instead auxiliary light source 9 is preferably powered simultaneously with strip light source so as to emit light simultaneously with strip light source 4, and it preferably, though not necessarily, comprises at least one light-emitting diode fixed to a supporting board 11 which in turn is fitted to the bottom of rear casing 2, next to the far end 8a of light guide bar 8, with light-emitting diode 10 facing the far end 8a.

Preferably, though not necessarily, supporting board 11 of auxiliary light source 9 may be coplanar with, or at any rate substantially parallel to, supporting board 6 of strip light source 4. In fact, the LEDs 5 of strip light source 4 and LED 10 of auxiliary light source 9 may advantageously be located on the same supporting board.

With reference to FIGS. 1, 2 and 3, automotive light 1 also comprises an intermediate filtering body 12, which is made of coloured transparent or semitransparent material, is fitted to light guide plate 7 and light guide bar 8, and is traversed by the light issuing from light guide plate 7 and light guide bar 8 and directed onto both rear portion 3a and lateral portion 3b of front lenticular half-shell 3.

In the example shown, filtering body 12 is preferably defined by a rigid structural strip 12 of transparent or semitransparent, preferably coloured material, which rests directly on light guide plate 7 and light guide bar 8, and is shaped to substantially only cover outer side 7b of light guide plate 7, the transverse band of light guide plate 7 from which the light diverted outwards by transverse light-extracting band 7c comes out, and the portion of light guide bar 8 from which the light diverted outwards by longitudinal light-extracting band 8c comes out.

The surface of structural strip 12 may optionally have optical elements or surface microinterruptions for distributing light randomly. For example, the major surface of structural strip 12 may be embossed, sandblasted or screen printed.

Also structural strip 12 is preferably made of a coloured transparent or semitransparent material, such as polymethyl methacrylate or polycarbonate, preferably via an injected molding process.

With reference to FIGS. 1 and 2, automotive light 1 preferably, though not necessarily, also comprises two cup-shaped reflecting bodies 13, 14, each having a preferably parabolic profile and located inside rear casing 2 with its concavity facing a respective area/zone of front lenticular half-shell 3, or rather of rear portion 3a of front lenticular half-shell 3; and two additional light sources 15, 16 designed to emit light when powered electrically, and each located at the bottom of a respective reflecting body 13, 14 to only backlight the area of front lenticular half-shall 3 positioned directly over the corresponding reflecting body 13, 14.

In the example shown, reflecting body 13 is preferably defined by a cup-shaped body 13 completely separate from rear casing 2, and which is preferably, though not necessarily, made of an opaque plastic material via an injection molding process, and is housed inside rear casing 2, directly over supporting board 6 of strip light source 4, with its concavity facing the corresponding area/zone of front lenticular half-shell 3. Cup-shaped body 13 is also housed inside rear casing 2, so as to be at least partly surrounded by light guide plate 7.

Reflecting body 14 instead is preferably formed directly at the bottom rear casing 2, in one piece with rear casing 2, and is preferably located beside reflecting body 13, preferably on the opposite side to light guide plate 7.

Cup-shaped bodies 13 and 14 preferably have respective metallized or otherwise mirror-finished inner surfaces 13i and 14i, so as to reflect/focus the light produced by respective light sources 15, 16 onto the corresponding areas of front lenticular half-shell 3. In the FIGS. 1 and 2 example, light sources 15 and 16 are preferably defined by two incandescent light bulbs 15 and 16 or similar, each of which projects inside respective reflecting body 13, 14 through an opening formed at the bottom of reflecting body 13, 14.

Operation of automotive light 1 is easily deducible from the above description, with no further explanation required, apart to pointed out that light sources 4 and 9 are connected to an electronic central control unit (not shown) which is able to simultaneously power light sources 4 and 9, or rather LEDs 5 and 10 of light sources 4 and 9, to selectively produce a low-intensity light beam or high-intensity light beam.

More specifically, the electronic central control unit (not shown) controls the light sources 4 and 9, or rather powers LEDs 5 and 10 of light sources 4 and 9, so to produce the low-intensity light beam when automotive light 1 is required to emit the light signal indicating the position/presence of the vehicle, i.e. the parking light; and so to produce the high-intensity beam when automotive light 1 is required to emit the light signal indicating operation of the vehicle's brake system, i.e. the stop light.

Advantages correlated to the particular structure of automotive light 1 are large in number.

In particular, the new backlighting system defined by light guide plate 7 and light guide bar 8 enables automotive light 1 to emit two strip-shaped light signals of different intensities, i.e. the parking light and stop light, using the same transparent or semitransparent portion of lenticular half-shell 3. Moreover, the resulting light strip is also clearly visible from the side of the vehicle, by also extending along a significant portion of lateral portion 3b of front lenticular half-shell 3.

Last but not least, the new backlighting system significantly reduces the manufacturing cost of strip light signal automotive lights.

Clearly, changes may be made to automotive light 1 as described herein without, however, departing from the scope of the present invention.

For example, light sources 15 and 16 may be defined by two groups of light-emitting diodes.

The invention claimed is:

1. Automotive light (1) comprising a substantially tub-shaped rear casing (2) designed to fit to a vehicle body; and a front lenticular half-shell (3), which closes an opening (2a) of the rear casing (2) and has at least one portion of transparent or semitransparent material; the front lenticular half-shell (3) having a rear portion (3a) substantially aligned with the rear of the vehicle body, and a lateral portion (3b) substantially aligned with the side of the vehicle body;
the automotive light (1) being characterized by also comprising a strip light source (4) designed to emit light when powered electrically, and which is housed inside the rear casing (2) in a position facing said rear portion (3a) of the front lenticular half-shell (3); and a light guide plate (7) of photoconductive material, which is shaped to substantially match the profile of said strip light source (4), and is housed inside the rear casing (2) in a position substantially perpendicular to the rear portion (3a) of the front lenticular half-shell (3), so that a first side (7a) of the plate faces the strip light source (4) to catch and conduct the light from the strip light source (4) into the body of the light guide plate (7), and a second side (7b) of the plate, opposite said first side (7a), faces said rear portion (3a) of the front lenticular half-shell (3) to direct the light propagating in said light guide plate (7) onto the lenticular half-shell (3);
two faces of the light guide plate (7) being designed to conduct to the second side (7b) of the plate the light entering the body of the light guide plate (7) from the first side (7a); and one of the two faces of the plate having a transverse light-extracting band (7c) which extends substantially from the first side (7a) of the plate to the second side (7b) of the plate, and is designed to locally extract the light, propagating in that limited portion of the light guide plate (7), onto the lateral portion (3b) of the front lenticular half-shell (3), so as to form a transverse light strip on the lateral portion (3b) of the front lenticular half-shell (3).

2. Automotive light as claimed in claim 1, characterized by also comprising a light guide bar (8) of photoconductive material, which projects from the first side (7a) of the light guide plate (7), and is aligned with the transverse light-extracting band (7c); and an auxiliary light source (9), which emits light when powered electrically, and is positioned facing the far end (8a) of the light guide bar (8), so that the light from the auxiliary light source (9) enters the body of the light guide bar (8) and propagates inside the body of the light guide bar (8) into the light guide plate (7); the light guide bar side that is aligned with the transverse light-extracting band (7c) of the light guide plate (7) in turn having a longitudinal light-extracting band (8c) designed/shaped to locally extract the light, propagating inside the body of the light guide bar (8), onto the lateral portion (3b) of the front lenticular half-shell (3), so as to form/project on the lateral portion (3b) of the front lenticular half-shell (3) a narrow transverse light strip forming an extension of the transverse light strip produced by the transverse light-extracting band (7c).

3. Automotive light as claimed in claim 2, characterized in that the auxiliary light source (9) is powered simultaneously with the strip light source (4), so as to emit light simultaneously with said strip light source (4).

4. Automotive light as claimed in claim 2, characterized in that the light guide bar (8) projects from the first side (7a) of the light guide plate (7) towards the bottom of the rear casing (2), while locally substantially skirting the lateral portion (3b) of the front lenticular half-shell (3).

5. Automotive light as claimed in claim 2, characterized in that the longitudinal light-extracting band (8c) on the light guide bar (8) has a straight, serrated, substantially rack-like profile.

6. Automotive light as claimed in claim 2, characterized in that the light guide bar (8) is formed in one piece with the light guide plate (7).

7. Automotive light as claimed in claim 2, characterized in that the light guide bar (8) is defined by a photoconductive material rod (8) which is positioned with its near end (8b) resting on a seat (7d) specifically realized on said first side (7a) of the light guide plate (7).

8. Automotive light as claimed in claim 1, characterized in that the transverse light-extracting band (7c) on the light guide plate (7) is located close to a lateral edge of the light guide plate (7).

9. Automotive light as claimed in claim 1, characterized in that the transverse light-extracting band (7c) on the light guide plate (7) has a straight, serrated, substantially rack-like profile.

10. Automotive light as claimed in claim 1, characterized by also comprising an intermediate filtering body (12) made of transparent or semitransparent material and fitted to the light guide plate (7) so as to be traversed by the light issuing from the light guide plate (7) towards the rear portion (3a) and the lateral portion (3b) of the front lenticular half-shell (3).

11. Automotive light as claimed in claim 10, characterized in that the intermediate filtering body (12) is fitted to the light guide plate (7) and the light guide bar (8), so as to be traversed by the light issuing from the light guide plate (7) and the light guide bar (8) towards the front lenticular half-shell (3).

12. Automotive light as claimed in claim 11, characterized in that the intermediate filtering body (12) is defined by a rigid strip (12) of transparent or semitransparent material, which rests directly on the light guide plate (7) and light guide bar (8), and is shaped to substantially only cover the second side (7*b*) of the light guide plate (7), the transverse band of the light guide plate (7) from which the light diverted outwards by said transverse light-extracting band (7*c*) issues, and the portion of the light guide bar (8) from which the light diverted outwards by said longitudinal light-extracting band (8*c*) issues.

13. Automotive light as claimed in a claim 1, characterized in the light guide plate (7) and/or the light guide bar (8) and/or the intermediate filtering body (12) are made of plastic material.

14. Automotive light as claimed in claim 1, characterized in that the strip light source (4) comprises a number of light-emitting diodes (5) arranged side by side on a supporting board (6) designed to fit inside, roughly next to the bottom of, the rear casing (2), with the light-emitting diodes (5) facing the rear portion (3*a*) of the front lenticular half-shell (3).

15. Automotive light as claimed in claim 1, characterized in that the auxiliary light source (9) is defined by at least one light-emitting diode (10) fitted to a supporting board (11) in turn designed to fit to the bottom of the rear casing (2), next to the far end (8*a*) of the light guide bar (8), with the light-emitting diode (10) facing the far end (8*a*).

16. Automotive light as claimed in claim 1, characterized in that the strip light source (4) is substantially U- or C-shaped.

17. Automotive light as claimed in claim 1, characterized by also comprising at least one cup-shaped reflecting body (13, 14) housed inside the rear casing (2), with its concavity facing a corresponding area of the rear portion (3*a*) of the front lenticular half-shell (3); and an additional light source (15, 16), which emits light when powered electrically, and is located at the bottom of said cup-shaped reflecting body (13, 14); the cup-shaped reflecting body (13, 14) also being so located inside the rear casing (2) as to be at least partly surrounded by the light guide plate (7).

* * * * *

UNITED STATES PATENT AND TRADEMARK OFFICE
CERTIFICATE OF CORRECTION

Page 1 of 1

PATENT NO. : 9,140,422 B2
APPLICATION NO. : 14/233448
DATED : September 22, 2015
INVENTOR(S) : Frank Arrivet et al.

It is certified that error appears in the above-identified patent and that said Letters Patent is hereby corrected as shown below:

On the Title Page (75) Inventors:

remove: Frank Arrivet, Montigny le Bretonneux (FR); Alain Buisson, Trappes (FR); Franco Marcori, Moggio Udinese (IT); Benoit Samson, Saint Remy les Chevreuse (FR)

insert: --Frank Arrivet, Trappes (FR); Alain Buisson, Trappes (FR); Franco Marcori, Moggio Udinese (IT); Benoit Samson, Trappes (FR)--

Signed and Sealed this
Twenty-second Day of March, 2016

Michelle K. Lee
*Director of the United States Patent and Trademark Office*